United States Patent [19]
Ilcisin et al.

[11] Patent Number: 5,917,463
[45] Date of Patent: Jun. 29, 1999

[54] PLASMA ADDRESSED LIQUID CRYSTAL DISPLAY PANEL WITH THINNED COVER SHEET

[75] Inventors: Kevin J. Ilcisin; Thomas S. Buzak, both of Beaverton, Oreg.; Paul C. Martin, Vancouver, Wash.

[73] Assignee: Tektronix, Inc., Wilsonville, Oreg.

[21] Appl. No.: 08/856,924

[22] Filed: May 15, 1997

Related U.S. Application Data

[60] Provisional application No. 60/018,000, May 21, 1996.

[51] Int. Cl.⁶ .................................................. G09G 3/28

[52] U.S. Cl. .................. 345/60; 445/24; 445/25

[58] Field of Search .................. 345/60, 87, 71; 349/32, 139; 445/24, 25; 313/582.584; 348/740

[56] References Cited

U.S. PATENT DOCUMENTS

| | | | |
|---|---|---|---|
| 5,077,553 | 12/1991 | Buzak | 345/87 |
| 5,499,122 | 3/1996 | Yano | 349/32 |
| 5,519,520 | 5/1996 | Stoller | 349/32 |
| 5,694,183 | 12/1997 | Ilcisin et al. | 349/32 |
| 5,725,406 | 3/1998 | Togawa | 445/24 |

*Primary Examiner*—Amare Mengistu
*Assistant Examiner*—Francis Nguyen
*Attorney, Agent, or Firm*—John D. Winkelman; John Smith-Hill

[57] ABSTRACT

A channel substrate assembly for a plasma addressed liquid crystal display device is made from a channel substrate formed with channels in a first main surface thereof, by attaching a cover sheet to the channel substrate with a first main surface of the cover sheet in confronting relationship with the first main surface of the channel substrate. The cover sheet is then thinned from its second main surface.

4 Claims, 2 Drawing Sheets

PLASMA ADDRESSED LIQUID CRYSTAL DISPLAY PANEL WITH THINNED COVER SHEET

CROSS REFERENCED TO RELATED APPLICATIONS

This application claims the benefit of U.S. Provisional Application No. 60/018,000, filed May 21, 1996, now abandoned.

BACKGROUND OF THE INVENTION

This invention relates to a plasma addressed liquid crystal display panel with a thinned cover sheet.

U.S. Pat. No. 5,077,553 discloses apparatus for addressing data storage elements. A practical implementation of the apparatus shown in U.S. Pat. No. 5,077,553 is illustrated schematically in FIG. 2 of the accompanying drawings.

The display panel shown in FIG. 2 comprises, in sequence from below, a polarizer 2, a channel substrate 4, a cover sheet 6 (commonly known as a microsheet), a layer 10 of electro-optic material, an array of parallel transparent data drive electrodes (only one of which, designated 12, can be seen in the view shown in FIG. 2), an upper substrate 14 carrying the data drive electrodes, and an upper polarizer 16. The channel substrate 4 is typically made of glass and is formed with multiple parallel channels 20 in its upper main face. The channels 20 are filled with an ionizable gas, such as helium. A ground electrode and a strobe electrode (not shown) are provided in each of the channels 20. The channels 20 are orthogonal to the data drive electrodes and the region where a data drive electrode crosses a channel (when viewed perpendicularly to the panel) forms a discrete panel element 22. Each panel element can be considered to include elements of the layer 10 and the upper and lower polarizers 2 and 16. In the case of a color display panel, the panel elements include color filters (not shown) between the layer 10 and the upper substrate 14. The region of the upper surface of the display panel that bounds the panel element constitutes a single pixel 24 of the display panel.

As explained in U.S. Pat. No. 5,077,553, when a suitable potential difference is established between the strobe and ground electrodes in one of the channels, the gas in that channel forms a plasma that provides a conductive path at the lower surface of the cover sheet 6. If the data drive electrode is at ground potential, there is no significant electric field in the volume element of electro-optic material and the pixel is considered to be off, whereas if the data drive electrode is at a substantially different potential from ground, there is a substantial electric field in that volume element of electro-optic material and the pixel is considered to be on.

It is conventional to assemble a display panel of the kind shown in FIG. 2 by forming a channel substrate assembly, including the channel substrate and the cover sheet, forming an upper substrate assembly, including the upper substrate, the data drive electrodes, and the layer of electro-optic material, and attaching the upper substrate assembly to the channel substrate assembly. In manufacture of the channel substrate assembly, the cover sheet is placed over the upper surface of the channel substrate and is sealed to the channel substrate around the periphery thereof.

The operation of attaching the cover sheet to the channel substrate sometimes results in damage to the cover sheet, such that the cover sheet, and possibly the entire channel substrate assembly must be discarded as scrap. A common cause of damage is a particle, such as a shard of glass, being caught between the channel substrate and the cover sheet, such that the cover sheet is sheared when it is pressed against the channel substrate.

SUMMARY OF THE INVENTION

When a pixel of a plasma addressed liquid crystal display panel of the kind shown in FIG. 2 is in the on state, the potential difference between the data drive electrode and ground is distributed between the layer 10 of electro-optic material and the cover sheet 6 approximately in accordance with the standard equation for a capacitive divider using the capacitance per unit area of the respective elements, and in order to minimize the drive voltage, and thereby minimize power dissipation, the capacitance per unit area of the cover sheet must be as large as possible. For a given dielectric constant of the cover sheet, this implies that the cover sheet should be as thin as possible.

Typically, the thickness of the cover sheet of a plasma addressed liquid crystal display panel is in the range 30–60 $\mu$m.

Since the capacitance per unit area of a thin cover sheet is less than that of a thicker cover sheet, a cover sheet having a thickness substantially less than 30 $\mu$m has substantial advantages over a thicker cover sheet. In particular, the drive voltage that must be applied to a data drive electrode in order to achieve a particular electric field in the layer of electro-optic material is reduced. Accordingly, less power is required to drive the data drive electrodes, and low cost drivers can be used. Further, cross-talk between data drive electrodes is reduced.

A cover sheet is considered to be of a thickness substantially less than a stated value if its thickness is less than 90 percent of the stated value, particularly less than 75 percent of the stated value, and more particularly less than 50 percent of the stated value.

Glass is commercially available in sheet form with a sheet thickness as small as 30 $\mu$m, but it is desirable that the cover sheet be even thinner. It is possible to thin a glass sheet to a thickness of less than 30 $\mu$m, for example by etching, but this is an expensive procedure. If the cover sheet of a display panel of the kind shown in FIG. 2 is thinned by etching and is then attached to the channel substrate and is damaged, the loss incurred is substantially greater than if an unthinned cover sheet had been used.

In accordance with a first aspect of the invention there is provided a method of manufacturing a channel substrate assembly for a plasma addressed liquid crystal display device, comprising providing a channel substrate formed with channels in a first main surface thereof providing a cover sheet having first and second main surfaces, attaching the cover sheet to the channel substrate with the first main surface of the cover sheet in confronting relationship with the first main surface of the channel substrate, and thinning the cover sheet from its second main surface.

In accordance with a second aspect of the invention there is provided a method of manufacturing a plasma addressed liquid crystal display device, comprising providing an upper substrate assembly that includes an upper substrate, an array of data drive electrodes adhering to a first main surface of the upper substrate, and an electro-optic layer over the array of data drive electrodes, providing a channel substrate formed with channels in a first main surface thereof, providing a cover sheet having first and second main surfaces, attaching the cover sheet to the channel substrate with the first main surface of the cover sheet in confronting relationship with the first main surface of the channel substrate, thinning the cover sheet from its second main surface, and attaching the upper substrate assembly to the thinned cover sheet with the electro-optic layer and the cover sheet between the channel substrate and the data drive electrodes.

BRIEF DESCRIPTION OF THE DRAWINGS

For a better understanding of the invention, and to show how the same may be carried into effect, reference will now be made, by way of example, to the accompanying drawings, in which.

In the several figures of the drawings, like reference numerals are used to designate corresponding components.

Words of orientation and position, such as upper and lower, are used in this specification to establish orientation relative to the drawings and are not intended to be limiting in an absolute sense. Thus, a surface that is described as upper in the specification may correspond, in a practical implementation of the invention, to a lower surface or a vertical surface, which is neither upper nor lower.

DETAILED DESCRIPTION

Figure 1A:
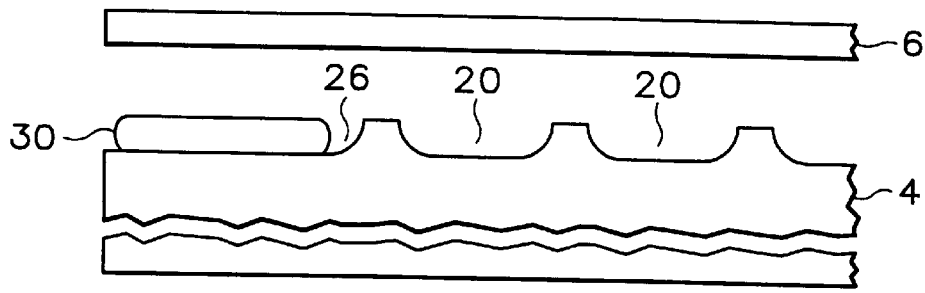
FIGS. 1A–1D illustrate steps in manufacture of a PALC display panel by a method in accordance with the present invention.
Figure 1B:
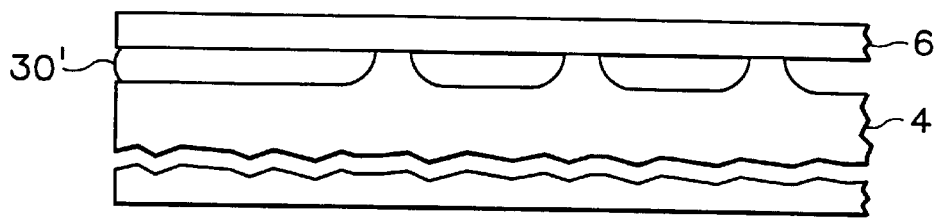
Figure 1C:
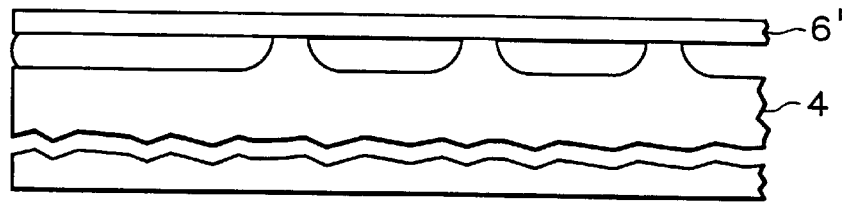
Figure 1D:
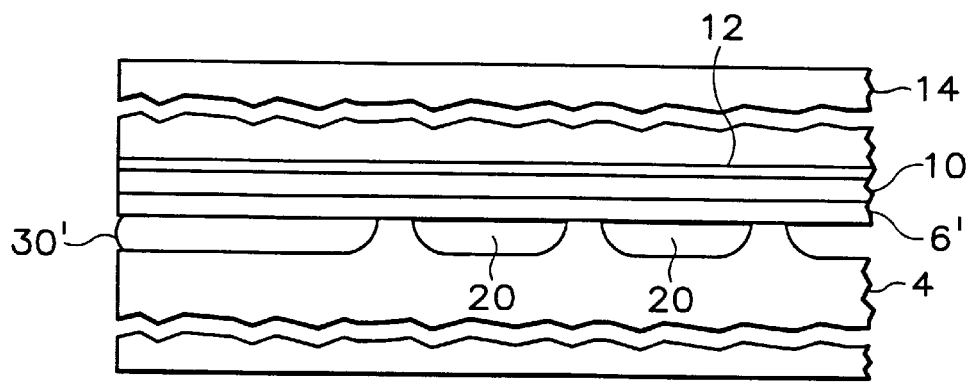
Figure 2:
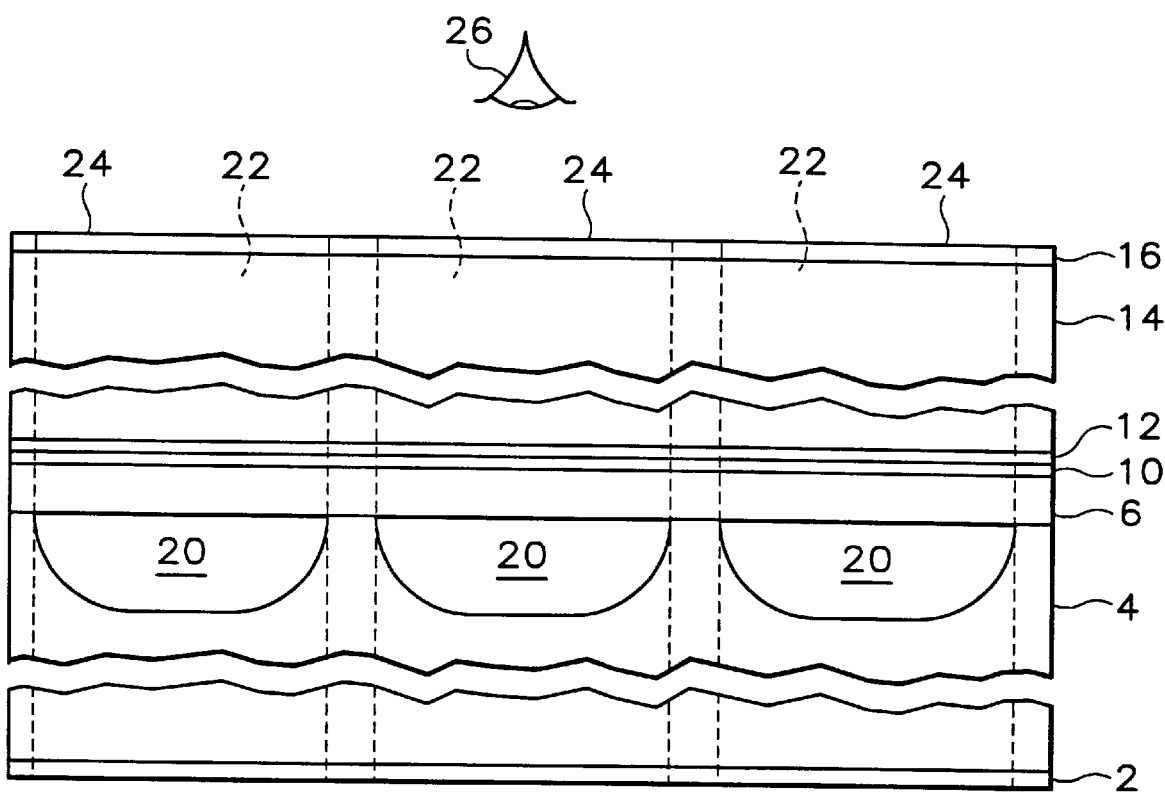
FIG. 2 illustrates schematically a sectional view of a PALC display panel in accordance with the prior art.

FIG. 1A illustrates the channel substrate 4 and the cover sheet 6 before they have been attached together. At the periphery of the channel substrate is a rabbet 26 or recess 26, which is formed concurrently with the channels 20. A strip 30 of bonding material is accommodated in the rabbet 26. The bonding material comprises a glass frit in an organic binder. The channel substrate is pre-baked to drive off the organic binder, leaving just a strip of glass frit in the rabbet 26. The strip of glass frit stands somewhat proud of the upper surface of the channel substrate. When the cover sheet is placed in contact with the upper surface of the channel substrate, the strip of glass frit is pressed down and fills the rabbet. The channel substrate assembly is then baked at a temperature such that the frit fuses to form a glass bead 30' (FIG. 1B) that seals the cover sheet to the substrate. The cover sheet is thereby attached to and supported by the channel substrate. The cover sheet 6 is then thinned by exposing its upper surface to an etchant that attacks glass. Several suitable etchants, particularly etchants having an F⁻ radical, such as hydrofluoric acid, are commercially available. The cover sheet may be thinned from an initial thickness in the range from about 30–50 $\mu$m to produce a thinned cover sheet 6' (FIG. 1C) having a thickness substantially less than 30 $\mu$m. After the cover sheet has been thinned, the upper substrate assembly is attached to the channel substrate assembly, as shown in FIG. 1D. Since the cover sheet is attached to the channel substrate before thinning takes place, the possibility of damaging a thinned cover sheet during the operation of attaching the cover sheet to the channel substrate is avoided.

If the etched surface of cover sheet is scattering, such that light passing through the cover sheet is depolarized, an internal polarizer may be provided between the cover sheet 6 and the electro-optic layer 10, as described in U.S. Pat. No. 5,594,183, the disclosure of which is hereby incorporated by reference herein.

It will be appreciated that the invention is not restricted to the particular embodiment that has been described, and that variations may be made therein without departing from the scope of the invention as defined in the appended claims and equivalents thereof.

We claim:

1. A method of manufacturing a channel substrate assembly for a plasma addressed liquid crystal display device, comprising:

providing a channel substrate formed with channels in a first main surface thereof, providing a cover sheet having first and second main surfaces, attaching the cover sheet to the channel substrate with the first main surface of the cover sheet in confronting relationship with the first main surface of the channel substrate, and thinning the cover sheet from its second main surface.

2. A method according to claim 1, wherein the channel substrate has a periphery and the step of attaching the cover sheet to the channel substrate comprises placing the cover sheet over the channel substrate and sealing the cover sheet to the channel substrate about the periphery thereof.

3. A method of manufacturing a plasma addressed liquid crystal display device, comprising:

providing an upper substrate assembly that includes an upper substrate, an array of data drive electrodes adhering to a first main surface of the upper substrate, and an electro-optic layer over the array of data drive electrodes, providing a channel substrate formed with channels in a first main surface thereof, providing a cover sheet having first and second main surfaces, attaching the cover sheet to the channel substrate with the first main surface of the cover sheet in confronting relationship with the first main surface of the channel substrate, thinning the cover sheet from its second main surface, and attaching the upper substrate assembly to the thinned cover sheet with the electro-optic layer and the cover sheet between the channel substrate and the data drive electrodes.

4. A method according to claim 3, wherein the channel substrate has a periphery and the step of attaching the cover sheet to the channel substrate comprises placing the cover sheet over the channel substrate and sealing the cover sheet to the channel substrate about the periphery thereof.

* * * * *